TRANSPOSED CONDUCTOR FOR DYNAMOELECTRIC MACHINES

Original Filed March 25, 1970 2 Sheets-Sheet 1

TRANSPOSED CONDUCTOR FOR DYNAMOELECTRIC MACHINES
Original Filed March 25, 1970 2 Sheets-Sheet 2
| | |
|---|---|
| a | l |
| b | k |
| c | j |
| d | i |
| e | h |
| f | g |
FIG. 3.
| | |
|---|---|
| g | f |
| h | e |
| i | d |
| j | c |
| k | b |
| l | a |
FIG. 4.
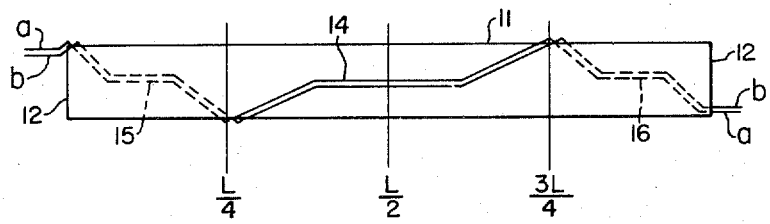
FIG. 5.
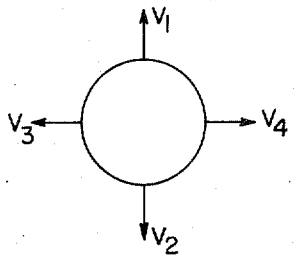
FIG. 6.
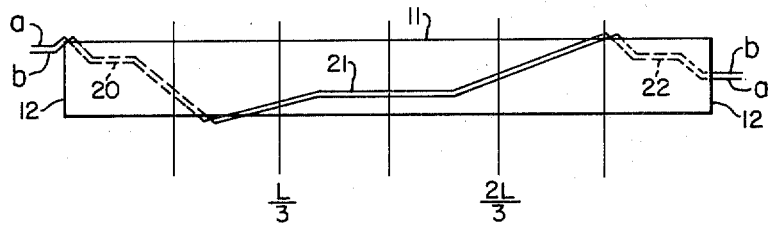
FIG. 7.
| | |
|---|---|
| a | l |
| b | k |
| c | j |
| d | i |
| e | h |
| f | g |
FIG. 8.
| | |
|---|---|
| e | d |
| f | c |
| g | b |
| h | a |
| i | l |
| j | k |
FIG. 9.
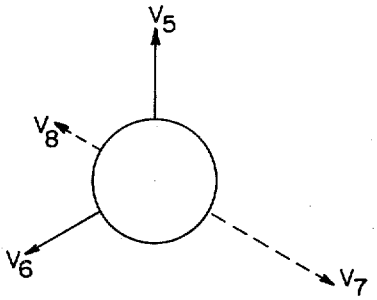
FIG. 10.

United States Patent Office

Re. 27,489
Reissued Sept. 26, 1972

27,489
TRANSPOSED CONDUCTOR FOR DYNAMOELECTRIC MACHINES

William C. Brenner, Pittsburgh, Pa., assignor to Westinghouse Electric Corporation, Pittsburgh, Pa.

Original No. 3,614,497, dated Oct. 19, 1971, Ser. No. 22,474, Mar. 25, 1970. Application for reissue Jan. 11, 1972, Ser. No. 216,971
Int. Cl. H02k *3/14*
U.S. Cl. 310—213 14 Claims

Matter enclosed in heavy brackets [ ] appears in the original patent but forms no part of this reissue specification; matter printed in italics indicates the additions made by reissue.

ABSTRACT OF THE DISCLOSURE

*This invention is a transposed stranded conductor bar or half coil for dynamoelectric machines that is effective in canceling out induced voltages, including the voltages induced in the end portions thereby minimizing eddy current losses and circulating currents in the conductor.*

BACKGROUND OF THE INVENTION

The present invention relates to a conductor for dynamoelectric machines, and more particularly to a transposed stranded conductor bar or half coil for machines of large size such as turbine generators.

The winding conductors of dynamoelectric machines are placed in slots in a laminated magnetic core. When currents flow in the conductors, magnetic fluxes occur across the slots which cause induced voltages and eddy currents in the conductor. Similar fluxes link the end turn portions of the conductor outside the slot, with some additional leakage flux from the rotor, and cause similar induced voltages in the end portions. For this reason, the conductors of large machines are always of stranded construction, being built up of a substantial number of relatively thin strands to minimize the eddy current loss. The fluxes, however, are not uniform but vary radially in density so that the induced strand voltages vary from strand to strand and circulating currents due to these unbalanced voltages flow between the strands causing excessive losses and heating. For this reason, it is necessary to transpose the strands in order to cancel out as far as possible the unbalanced strand voltages to minimize the circulating currents and resultant heating.

The most commonly used type of transposition which has been in general use for many years is the so-called Roebel transposition. In this arrangement, as shown in Roebel, U.S. Pat. No. 1,144,252, the strands are disposed in two side-by-side stacks and are transposed within the slot by crossovers or cranks between the stacks. In each stack, the strands are inclined so that each strand moves radially to the top or bottom of the stack, crosses over to the other stack, moves radially through the other stack and crosses over back to the first stack. Thus, looking at the end of the conductor, each strand moves through an angle of 360° in going from one end of the slot to the other, and emerges at the other end in the same relative position at which it entered the slot. Since the spacing between crossovers, or the cranking distance, is uniform throughout the length of the slot, each strand occupies all positions in the slot for equal distances and the induced strand voltages exactly balance out so that the transposition is completely balanced within the slot. The transposition within the slot, however, does not affect the induced voltages in the end portions of the conductor outside the slot which would cause circulating currents and excessive heating. In the usual practice, this has been overcome by dividing the strands into groups in the end portions and transposing the groups at the connections between adjacent conductors which form a complete coil. In this way the strand voltages in the end portions can be balanced out in a complete coil or group of coils.

The Roebel transposition with group transpositions in the end portions is entirely satisfactory where the strands are insulated from each other throughout a complete coil or group of coils. In some cases, however, it is necessary or desirable to join the strands together at each end of each conductor bar or half coil. In very large turbine generators, for example, where a liquid coolant such as water is circulated through hollow strands in the conductor, it is impractical because of manufacturing difficulties to provide an individual water connection for each strand and a common water header or connector is used at each end of the half coil to supply water to all the strands of the conductor. This necessarily shorts the strands together at each end so that they all are electrically in parallel within the conductor and group transpositions are not possible. With the strands thus shorted together at each end, the conventional Roebel transposition still results in balanced voltages within the slot, but the unbalanced strand voltages in the end portions of the conductor result in large circulating current and excessive heating which is too great to be tolerated.

Our scheme for cancelling the unbalanced voltages in the end portion has been proposed in Ringland, U.S. Pat. No. 2,281,641. In this scheme the end portions of the conductor at opposite ends are inverted with respect to each other. This is done by transposing the strands within the slot through 180° in the first quarter of the slot length, through 180° in the second and third quarters of the slot length, and through another 180° in the last quarter of the slot, making a total transposition of 540° within the slot. The end portions are thus inverted with respect to each other, and with twice the crossover spacing in the center half of the slot length as compared to the spacing in the first and fourth quarters, the arrangement is such that each strand still occupies all positions in the slot for equal distances and a completely balanced transposition within the slot is obtained. The inversion of the end portions with respect to each other tends to balance the strand voltages in the end portions and if the voltages were the same at opposite ends, the strands could then be shorted together at both ends if desired. The fluxes in the end regions at opposite ends of the machine may not always be the same, however, and the desired degree of cancellation cannot always be obtained. A modification of this type of transposition has therefore been suggested in Willyoung, U.S. Pat. No. 3,118,015, in which the strands are transposed within the slot through some angle between 360° and 540°, so that the end portions are only partially inverted with respect to each other and any differences in the end region fluxes and in the induced strand voltages at opposite ends can be compensated for. The spacing of the crossovers in the slot portion is adjusted so that a balanced transposition is obtained within the slot and, with proper design, approximate cancellation of the strand voltages may be obtained.

There is, however, another problem which is not materially helped by these arrangements. Since the induced voltages in the end portions are only approximately balanced, some residual eddy currents or circulating currents will occur in the strands, and as the end portions of the conductor are not transposed these residual currents are not uniformly distributed. Thus, the top strands of the conductor carry much higher currents than the strands in the center of the conductor which tend to have minimum current, while the strands at the bottom of the conductor carry currents of intermediate magnitude. Thus, even if the transposition is complete within the slot and the induced end portion voltages are approximately balanced so hat circulating currents are effectively minimized, there s still a nonuniform current distribution between the trands and local overheating of the strands carrying the ighest currents can occur.

SUMMARY OF THE INVENTION

It is the principal object of the present invention to provide an improved transposed stranded conductor bar or alf coil for dynamoelectric machines which effectively ancels out induced strand voltages, including the voltages nduced in the end portions, to minimize eddy current osses and circulating currents in the conductor and which esults in a more uniform current distribution between the trands than has previously been obtainable.

As discussed above, prior approaches to this problem ave involved the provision of complete transpositions within the slot portion of the conductor to obtain a perfectly balanced transposition within the slot, and various xpedients, including group transpositions and complete or artial inversion of the end portions, have been used or roposed to cancel the unbalanced induced strand voltages in the end portions.

The present invention is based on a different approach in which the slot portion of the conductor is incompletely ransposed so that unbalanced strand voltages occur in he slot portion, and these unbalanced voltages are made to effectively cancel the unbalanced strand voltages occurring n the end portions, so that the conductor as a whole is balanced and circulating currents are minimized with a more niform distribution of current between the strands than as heretofore been possible. In the most general case this s accomplished by nonuniform spacing of the crossovers to btain any desired degree of unbalance within the slot ortion. This may be done in any desired manner and could nvolve a different value for each crossover space. Such a onductor might be somewhat difficult to design and manuacture, and in the preferred embodiments of the invention, he desired unbalance in the slot is obtained by spacing the rossovers so as to provide untransposed sections at approriate position in the lot, together with complete or partial nversion of the end portions of the conductor. In this way he unbalanced voltages in the slot portion resulting from he untransposed sections can be made to balance the trand voltages occurring in the end portions and a completely balanced conductor is obtained in which circulating urrents are effectively minimized and substantial uniormity of current distribution is obtained.

DESCRIPTION OF THE DRAWINGS

The invention will be more fully understood from the ollowing detailed description, taken in connection with he accompanying drawings, in which:

FIGS. 3 and 4 are diagrammatic transverse sections on he lines III—III and IV—IV, respectively, of FIG. 2 llustrating the relative positions of the strands at opposite nds of the conductor;

FIG. 5 is a diagram illustrating the manner in which the trands are arranged in the slot portion of the conductor;

FIG. 6 is a diagram showing the relative positions of the nbalanced voltages in the conductor;

FIG. 7 is a diagram similar to FIG. 5 but showing anther embodiment of the invention;

FIGS. 8 and 9 are diagrammatic transverse sectional iews at the opposite ends of the conductor of FIG. 7 howing the relative positions of the strands; and FIG. 10 is a diagram showing the relative positions of he unbalanced voltages in the conductor of FIG. 7.

DESCRIPTION OF PREFERRED EMBODIMENTS

Figure 1:
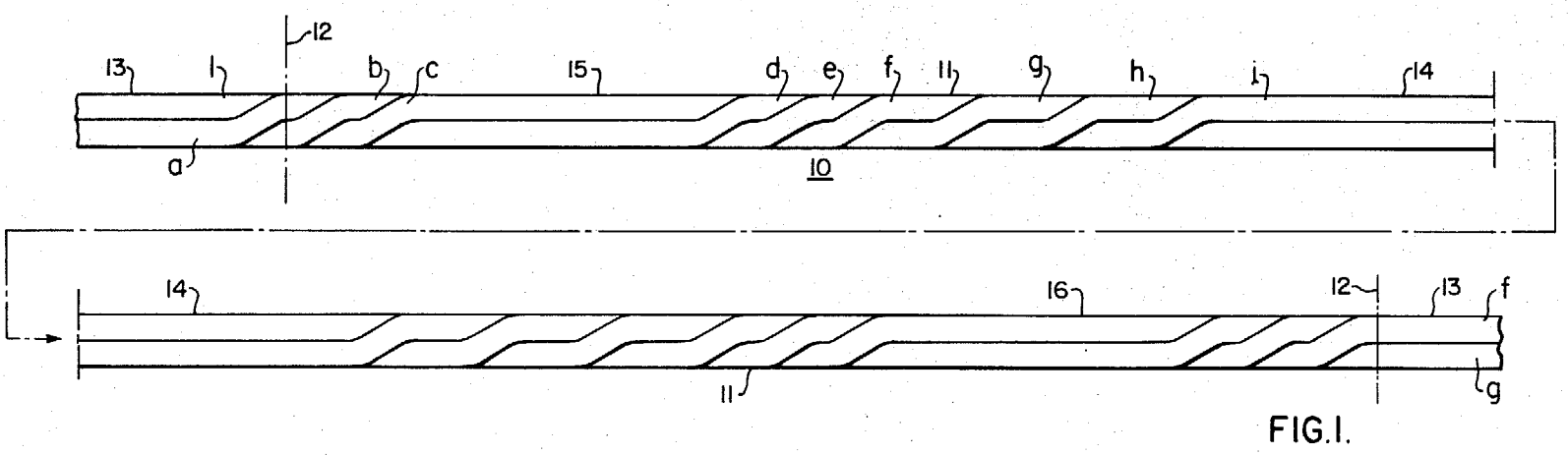
FIGS. 1 and 2 are a top view and a side view, respecively, of a conductor bar embodying the invention.
Figure 2:
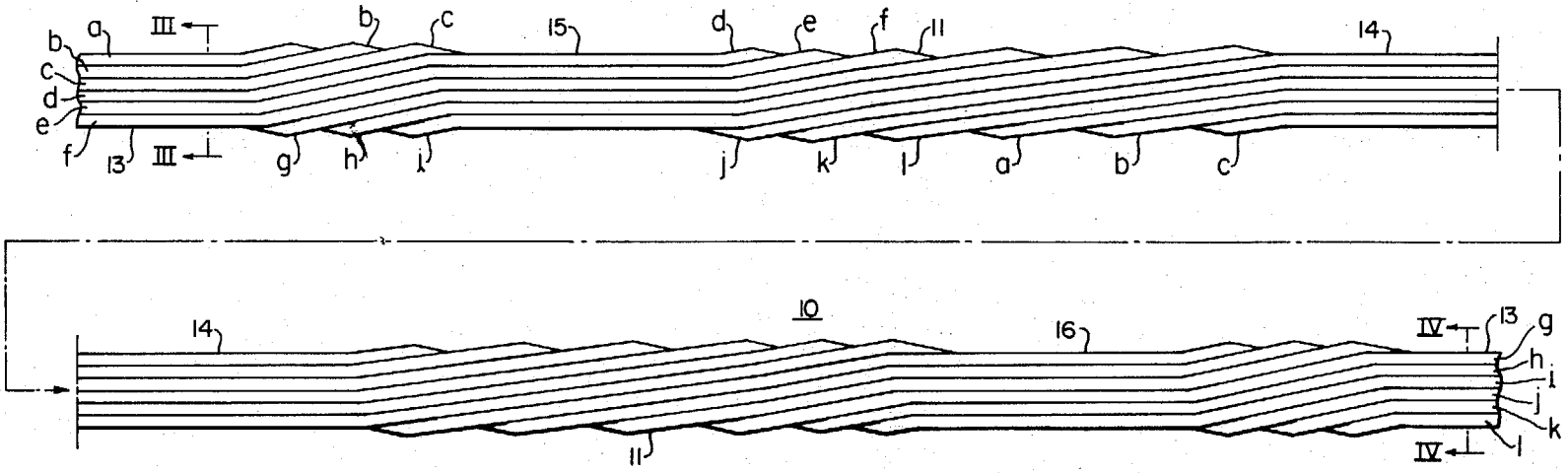

There is shown in FIGS. 1 and 2 a conductor bar or half oil 10 for use in a dynamoelectric machine such as a large urbine generator. The conductor 10 has a straight central slot portion 11 adapted to be received in the slot of a stator core. The slot portion 11 extends between the dot-dash lines 12 which may be taken as representing the ends of a stator core. The conductor 10 also has end turn portions 13 at each end which may be of any suitable configuration. The end portions 13 are only partially shown and are usually formed in a complex curve to extend circumferentially around the machine for connection to the end portion of another half coil lying in another slot. The conductor 10 is a stranded conductor and is made up of a plurality of rectangular strands designated by the letters a through l. The strands are arranged, as shown, in two side-by-side stacks in the usual manner. Six strands have been shown in each stack for the purpose of illustration although it will be understood that a much larger number of strands would normally be used in an actual conductor. It will also be understood that the strands are lightly insulated from each other, and that the conductor 10 is encased in a suitable insulating sheath to provide ground insulation for the conductor in the usual manner, although the insulation has been omitted from the drawing for clarity. Some or all of the strands may be made hollow for circulation of a liquid coolant, or other cooling means may be provided such as coolant ducts disposed between the stacks.

The strands of which the conductor 10 is composed are transposed within the slot portion 11 of the conductor, the end portions 13 being untransposed. The transposition is made by crossovers between stacks in a manner generally similar to that of the usual Roebel transposition. Thus the strands a through f at the left-hand end of the slot portion, as viewed in FIG. 2, are in the near or front stack and are bent to move upward through the stack to the top and then to the rear stack by crossovers or cranks, as seen in FIG. 1. These strands then move down in the rear stack to the bottom and back to the front stack by another crossover, from which they again move upward to the top and by a third crossover to the rear stack. The strands g through l which are initially in the rear stack at the left end move downward to the bottom, cross over to the front stack, move upward to the top and so on to the end of the slot portion of the bar.

In accordance with the present invention, the spacing of the crossovers, or the cranking distance, is made nonuniform so that the transposition is incomplete or unbalance in the slot and unbalanced strand voltages occur. The arrangement is made such that the unbalanced voltages thus occurring within the slot portion balance the induced voltages occurring in the untransposed end portions of the conductor, so that the complete conductor including the end portions is balanced and circulating currents and eddy current losses are minimized while a more uniform distribution of current between the strands is obtained than can be obtained by the conventional arrangements. In the most general case any kind or degree of nonuniformity of spacing of the crossovers may be used which will produce the desired unbalance in the slot portion, and different values for each crossover space may be used. To facilitate design and manufacture of the conductor, however, some degree of uniformity or regularity in the cranking distances is desirable, and it has been found that excellent results are obtained by varying the crossover spacings in such a manner that one or more discrete, untransposed sections are provided in the slot portion with evenly transposed sections between them.

One specific embodiment of the invention which has been found to give extremely good results is illustrated in FIGS. 1 through 6. In this embodiment, each strand is transposed through an angle of 540° within the slot, with a central untransposed section 14 at the 270° position and with untransposed sections 15 and 16 at the 90° and 450° positions adjacent the ends of the slot portion of the conductor. The end portions 13 are thus fully inverted with respect to each other, as illustrated in FIGS. 3 and 4 which show the relative positions of the strands at opposite ends of the slot portion, but unbalanced voltages occur in the slot portion 180° from each other and displaced 90° and 270° from the voltages induced in the end portions, so that a substantially balanced arrangement for the conductor as a whole results.

The arrangement will be more clearly understood from the diagram of FIG. 5 which represents the disposition of two of the strands within the slot portion 11 of the conductor. Starting at the left-hand end, the strand a is initially in the top position of the front or near stack of strands. This strand crosses over to the rear stack, as indicated by the dotted line in FIG. 5, and moves downward in the rear stack through 180°, that is, to the bottom of the conductor, in the first one-quarter of the slot length L. A straight section, however, is introduced as indicated at 15 at the point where the strand a has moved halfway down through the stack, which is the 90° point for that strand. Similarly, the strand b moves up to the top of the front stack, crosses over to the rear stack, moves downward to and through the straight portion 15, and then down again to reach its 180° position at the end of the first quarter of the slot length. At the one quarter point of the slot length the strand a crosses over to the front stack, as indicated by the solid line, and moves upward through the front stack through 180°, or to the top of the stack, in the second and third quarters of the slot length but with a straight portion 14 at the half-way position in the stack which corresponds to a total transposition of 270° at that point. Similarly, the strand b moves upward through 180° in the second and third quarters of the slot length with a straight portion at its 270° position. In the fourth quarter of the slot length the strands a and b move downward in the rear stack through another 180° with a straight or untransposed portion 16 at the 90° (or 450°) position. The remaining strands are similarly transposed as can be seen in FIGS. 1 and 2.

Thus the strands are transposed through 180° in the first quarter of the slot, 180° in the second and third quarters of the slot, and another 180° in the fourth quarter for a total transposition of 540°, the crossover spacings being increased in the second and third quarters to suitably change the cranking rate as clearly shown in FIG. 1. Untransposed sections are introduced at the 90° and 270° points, the 90° untransposed section being divided into two halves disposed in the first and fourth quarters at the 90° and 450° points, respectively, as indicated at 15 and 16. The 540° transposition results in complete inversion of the end portions 13 of the conductor with respect to each other, as shown in FIGS. 3 and 4, and the untransposed sections 14 and 15–16 are also inverted with respect to each other since they are 180° apart so that the unbalanced slot voltages introduced by the untransposed sections are opposed.

The effect of this arrangement is shown in the diagram of FIG. 6 in which the circle represents the 360° available in the slot for transposition of the conductor strands, and the arrows represent the relative angular positions and effective magnitudes of the untransposed sections of the conductor. The arrows $V_1$ and $V_2$ represent the untransposed end portions 13 of the conductor and are shown as being equal in magnitude and opposite in position because of the complete inversion of the end portions at opposite ends. The arrow $V_3$ represents the untransposed 90° section 15–16 and the arrow $V_4$ represents the 270° section 14. Since these untransposed sections are inverted with respect to each other, they are shown as being opposed. The untransposed section 14 is made equal in length to the 90° untransposed section which is divided into two equal halves 15 and 16, as previously explained, each of which is half the length of the untransposed section 14. The arrows $V_3$ and $V_4$ are therefore shown as being equal and opposite.

It will be seen that unbalanced voltages have been introduced in the slot portion by the imperfect transposition but that these voltages and the voltages induced in the end portions are substantially balanced, so that the net result, considering the conductor as a whole, is a more nearly perfectly balanced conductor in which eddy currents and circulating currents between strands are substantially eliminated.

This arrangement results in a major advantage, as compared to previously known transpositions, in greatly improving the distribution of residual currents between the strands. The effect of untransposed end portions of a conductor is to cause a nonuniform distribution of current between the strands. In the conventional completely transposed 360° Roebel conductor with untransposed end portions, the strands at the top of the conductor carry relatively large currents, while the strands near the middle of the stacks carry a much lower current. The strands at the bottom of the conductor carry currents of intermediate value. This nonuniform distribution of current causes excessive currents in particular strands with local overheating. A 540° transposition with complete transposition with the slot, as in the above-mentiond Ringland patent, tends to balance the strand voltages because of the inversion of the end portions but a similar nonuniform current distribution occurs, with excessive local overheating of the strands carrying the highest currents. The introduction of additional unbalanced voltages 90° away from the end portion voltages by untransposed sections of the conductor in the slot shifts the current patterns by 90° and has the effect of averaging out the maximum and minimum currents. In this way a much more uniform distribution of the strand currents is obtained and the problem of excessive current in particular strands with localized overheating is minimized. The average loss factor is also greatly improved.

As previously indicated, the invention may be applied with any desired degree or arrangement of nonuniformity in spacing of the crossovers to obtain any desired or necessary unbalanced voltages in the slot portion of the conductor, preferably by means of untransposed sections. In some cases less than complete inversion of the end portions may be desirable. An example of such an arrangement is shown in the embodiment of the invention illustrated in FIGS. 7 through 10. In this embodiment, the strands are transposed through an angle of 480° in the slot portion of the conductor and untransposed portions are provided at the 60° and 240° positions in the slot portion. This is shown in FIG. 7 which is a diagram similar to FIG. 5 showing the arrangement of representative strands a and b, the remaining strands being similarly transposed. As before the solid lines represent the portions of the strand in the front stack of strands and the dotted portions represent the portions of the strands in the rear stack. In this instance, starting at the left, the strands are transposed through 120° in the first part of the slot portion 11, preferably in the first one-sixth of the slot length as shown in FIG. 7. A straight or untransposed section 20 is provided at the 60° position, which in the case of strand a is one-third of the distance from the top to the bottom of the stack. The strands are further transposed through an additional 240° in the central part of the slot portion with increased spacing between crossovers to provide a lower cranking rate. An untransposed section 21 is introduced at the 240° position which in the case of strand a is one-third of the distance up from the bottom of the conductor, or 180° plus 60° from the beginning of the slot. The strands are then further transposed in the right-hand end of the slot portion, preferably the last one-sixth of the slot length, through an additional angle of 120° for a total transposition of 480°, the cranking rate being increased in this portion. An additional untransposed section 22 is interposed in this last part of the conductor at the 60° (or 420°) position, corresponding to the untransposed section 20, so that the sections 20 and 22 in effect constitute a 60° untransposed section divided into two halves adjacent opposite ends of the conductor. The 480° transposition represents one complete 360° plus an additional 120° so that the end portions 13 are not completely inverted with respect to each other but the inverion is only partial, as illustrated in FIGS. 8 and 9 which re schematic transverse sectional views at opposite ends of the conductor illustrating the relative positions of the ndividual strands.

The effect of the arrangement of FIG. 7 is illustrated by he diagram of FIG. 10. In this figure, the arrows $V_5$ and $/_6$ represent the angular positions of the untransposed end ortions of the conductor, which are 120° apart due to he 480° transposition and the resulting partial inversion. n order to provide a substantially balanced condition, an ntransposed section 21 at the 240° position, represented y $V_7$, is needed. The flux distribution within the slot is lifferent from the flux distribution in the end regions, owever, and to compensate for the difference in flux lensities, the untransposed section 21 is partially balanced y the untransposed sections 20, 22 at the 60° position, epresented by the arrow $V_8$. It will be seen that the net esult is to provide a substantially completely balanced ondition to cancel out all the unbalanced voltages in the ntire coil including the end portions so as to eliminate or ninimize circulating currents. This arrangement also has a imilar effect to the previously described embodiment in mproving the current distribution between strands to ninimize excessive strand currents and the resulting localzed overheating in the manner previously described.

It will be apparent that any desired degree of slot portion nbalance can be obtained by suitably varying the crossver spacings to introduce untransposed section in the slot ortion at the desired locations. In this way the unbalanced oltages induced in the untransposed end portions of the onductor can be compensated completely, or to any deired extent, and the current distribution between strands an be made much more uniform than has previously been ossible. Two specific embodiments of the invention have een shown for the purpose of illustration which have been ound to give extremely satisfactory performance. The 40° transposition of FIG. 5 is particularly desirable in nany cases because of the ease of designing such a conducor. In this case the untransposed sections at 270° and at 0° are of equal lengths and to compensate the end porion voltages they are made shorter than the actual length f the end poritons because the rate of change of flux densty is greater in the slot portion than in the end regions ecause of the shorter flux path. This is a simple relation nd the length of the untransposed sections relative to the nd portions is directly proportional to the relative lengths f the respective flux paths. Thus the design is very simple. n the case of transpositions less than 540°, such as the ne illustrated in FIG. 7, the length of the untransposed ections of the conductor is again related to the length of he end portions and the proportioning between the 60° nd 240° untransposed sections depends on the relative lux densities in the slot and in the end regions of the nachine and can readily be determined. It will be apparnt that the principles described can be applied to other rrangements with total transposition angles between 360° nd 540° and with untransposed sections in the slot uitably arranged, preferably in pairs inverted with repect to each other, to obtain any desired degree of comensation for the end portion voltages.

It will now be apparent that an improved transposition as been provided for the winding conductors of dynamolectric machines, especially those of large size. This is ased on a new approach to the problem of transposition n which the conductor is not completely transposed within the slot portion but unbalanced voltages are deliberatey introduced in the slot portion by means of untransosed sections, or otherwise by nonuniform spacing of he crossovers, so that the unbalanced voltages in the slot ortion can be made to effectively compensate the unbalnced voltages induced in the end portions of the conluctor and at the same time greatly improve the distribuion of current between strands so that the problem of ocalized overheating is minimized. Certain specific emodiments of the invention have been shown and described for the purpose of illustration but it will be apparent that numerous other embodiments are possible within the scope of the invention.

I claim:

1. A conductor bar for a dynamoelectric machine having a straight central slot portion and two end portions, said conductor bar comprising a plurality of strands disposed in side-by-side stacks, said strands being transposed in the slot portion of the bar by crossovers from one stack to another, said crossovers being unequally spaced along the bar in the slot portion such that the transposition is incomplete in the slot portion *and the strands are inverted in relative position in the two end portions of the bar*, whereby unbalanced strand voltages occur in the slot portion [to] *which substantially completely* compensate strand voltages occurring in the end portions, the end portions being untransposed.

2. A conductor bar as defined in claim 1 in which there is at least one untransposed section in the slot portion of the bar.

3. A conductor bar as defined in claim 1 in which the number and spacing of the crossovers are such that the strands are arranged in different relative positions at opposite ends of the bar and there is at least one untransposed section in the slot portion of the bar.

4. A conductor bar for a dynamoelectric machine having a straight central slot portion and two end portions, said conductor bar comprising a plurality of strands disposed in two stacks placed side-by-side, the strands having successive crossovers from one stack to the other in the slot portion of the bar and each strand changing position vertically in the stack between crossovers, so that the strands are transposed in the slot portion of the bar and each strand, as viewed from the end of the bar, is transposed through an angle [of not less] *greater* than 360° *but not more than 540°*, the crossovers being nonuniformly spaced along the bar in such a manner that there is at least one untransposed section in the slot portion, whereby unbalanced strand voltages occur in the slot portion to *substantially completely* compensate strand voltages occurring in the end portions of the bar.

5. A conductor bar as defined in claim 4 in which the crossovers are relatively closely spaced adjacent the ends of the slot portion and are spaced further apart in the central part of the slot portion, and in which there is at least one section of the bar in the slot portion with no crossovers so that the strands are untransposed in that section.

6. A conductor bar as defined in claim 4 in which the strands are transposed through an angle of 540° and untransposed sections are provided in the slot portion at positions corresponding to strand transpositions of 90° and 270°.

7. A conductor bar as defined in claim 6 in which the untransposed section at the 270° position is in the center of the bar and untransposed sections of substantially equal length are provided adjacent the ends of the slot portion of the bar at positions corresponding to strand transpositions of 90° and 450°.

8. A conductor bar as defined in claim 4 in which the strands are transposed through an angle greater than 360° and less than 540° and untransposed sections are provided in the slot portion at a position corresponding to strand transposition through half of the total angle of transposition and at a position 180° from the first-mentioned position.

9. A conductor bar as defined in claim 8 in which the untransposed section at the first-mentioned position is in the center of the bar and the untransposed section at the second-mentioned position is divided into two sections adjacent the ends of the slot portion in the same angular position.

10. A conductor bar as defined in claim 8 in which the total angle of transposition is 480° and the untransposed sections are at positions corresponding to strand transpositions of 240° and 60°, respectively.

*11. A conductor bar for a dynamoelectric machine having a straight central slot portion and two end portions, said conductor bar comprising a plurality of strands disposed in side-by-side stacks, said strands being transposed in the slot portion of the bar by crossovers from one stack to another, said crossovers being unequally spaced along the bar in the slot portion, the number and spacing of the crossovers being such that there is at least one untransposed section in the slot portion of the bar and that the strands are inverted in relative position in the two end portions of the bar, whereby induced strand voltages occurring in the end portions are effectively compensated by unbalanced strand voltages occurring in the slot portion.*

*12. A conductor bar as defined in claim 11 in which there are two untransposed sections of substantially equal length, the strands in said untransposed sections being inverted in relative position with respect to each other, one of said untransposed sections being at the center of the bar and the other untransposed section being divided into two portions disposed near the ends of the slot portion.*

*13. A conductor bar for a dynamoelectric machine having a straight central slot portion and two end portions, said conductor bar comprising a plurality of strands disposed in two stacks placed side-by-side, the strands having successive crossovers from one stack to the other in the slot portion of the bar and each strand changing position vertically in the stack between crossovers, so that the strands are transposed in the slot portion of the bar, each strand being transposed through an angle greater than 360° but not more than 540° in the slot, whereby the strands are at least partially inverted in relative position in the two end portions of the bar, the crossovers being relatively closely spaced adjacent the ends of the slot portion and spaced farther apart in the central part of the slot portion, and the crossovers also being unequally spaced along the bar such that there is at least one untransposed section in the slot portion of the bar, whereby induced strand voltages occurring in the end portions are effectively compensated by unbalanced strand voltages occurring in the slot portion.*

*14. A conductor bar as defined in claim 13 in which there are at least two separate untransposed sections, the strands in said untransposed sections being inverted in relative position with respect to each other.*

References Cited

The following references, cited by the Examiner, are of record in the patented file of this patent or the original patent.

UNITED STATES PATENTS

| | | | |
|---|---|---|---|
| 3,118,015 | 1/1964 | Willyoung | 174—33 |

FOREIGN PATENTS

| | | | |
|---|---|---|---|
| 754,815 | 8/1956 | Great Britain | 310—213 |
| 960,980 | 6/1964 | Great Britain | 310—213 |
| 1,144,387 | 2/1963 | Germany | 310—213 |

DAVID X. SLINEY, Primary Examiner

U.S. Cl. X.R.

310—260